US010012565B2

(12) United States Patent
Sun et al.

(10) Patent No.: US 10,012,565 B2
(45) Date of Patent: Jul. 3, 2018

(54) FLOWLINE PRODUCTION EQUIPMENT FOR MOTOR RUNNING TEST

(71) Applicant: ZHEJIANG LINIX MOTOR CO., LTD., Dongyang, Zhejiang (CN)

(72) Inventors: Zhubing Sun, Zhejiang (CN); Liangliang Ren, Zhejiang (CN); Ronghua Jin, Zhejiang (CN)

(73) Assignee: ZHEJIANG LINIX MOTOR CO., LTD., Dongyang, Zhejiang (CN)

( * ) Notice: Subject to any disclaimer, the term of this patent is extended or adjusted under 35 U.S.C. 154(b) by 83 days.

(21) Appl. No.: 15/168,049

(22) Filed: May 29, 2016

(65) Prior Publication Data

US 2017/0067797 A1 Mar. 9, 2017

(30) Foreign Application Priority Data

Sep. 8, 2015 (CN) .......................... 2015 1 0566235

(51) Int. Cl.
*G01M 15/02* (2006.01)

(52) U.S. Cl.
CPC ................................... *G01M 15/02* (2013.01)

(58) Field of Classification Search
USPC ............... 73/116.01, 116.02, 116.03, 116.04, 73/116.05
See application file for complete search history.

(56) References Cited

U.S. PATENT DOCUMENTS 5,600,059 A * 2/1997 Sondey ................. G01M 15/02 198/346.1
7,000,460 B1 * 2/2006 Cline .................... G01M 15/02 73/116.03
2009/0025466 A1 * 1/2009 Moritani ............... G01M 15/02 73/114.01
2012/0017431 A1 * 1/2012 Carcy ..................... B66C 17/06 29/705
2015/0177102 A1 * 6/2015 Yamao .................. G01M 15/02 73/116.05

* cited by examiner

*Primary Examiner* — Eric S McCall
(74) *Attorney, Agent, or Firm* — Global IP Services; Tianhua Gu

(57) ABSTRACT

The invention discloses a motor running test line, comprising a plurality of motor placing plates, a rack and a plurality of station frames; the rack is provided with an inlet end, and the station frame is provided with an outlet end; the rack is provided with a rack slide rail which makes it possible for motor placing plates to slide thereon, each station frame is provided with a station frame slide rail which makes it possible for motor placing plates to slide thereon, and one end of each station frame is communicated to the rack slide rail, respectively; each station frame is provided with a plurality of stations, each station is equipped with a set of motor running test equipment, and the motor running test equipment comprises an equipment body, a running switch and a motor wiring terminal; and the equipment body is equipped with a timing device.

13 Claims, 4 Drawing Sheets

2
21
4
22
A
6
4
31
32
1
8
3
9
7

FLOWLINE PRODUCTION EQUIPMENT FOR MOTOR RUNNING TEST

TECHNICAL FIELD OF THE INVENTION

The present invention relates to a line for motor running tests.

BACKGROUND OF THE INVENTION

At present, after motors are assembled, the motors are transferred to a test workshop for running tests. A running test in forward and reverse directions is performed by placing a motor on each workbench and connecting the motor to motor running test equipment. However, the efficiency is relatively low since it is impossible to form line operations; and the workbenches occupy a relatively large space and it is desired to provide many detection workers, and in the case of the shortage of the detection workers, the utilization of the motor running test equipment is relatively low and the time required for detection is relatively long.

SUMMARY OF THE INVENTION

An objective of the present invention is to provide a line for motor running tests.

To achieve this objective, the present invention adopts the following technical solution. A motor running test line is provided, including: a plurality of motor placing plates, a rack and a plurality of station frames; the rack is provided with an inlet end, and the station frame is provided with an outlet end; the rack is provided with a rack slide rail which makes it possible for motor placing plates to slide thereon, each station frame is provided with a station frame slide rail which makes it possible for motor placing plates to slide thereon, and one end of each station frame is communicated to the rack slide rail, respectively; each station frame is provided with a plurality of stations, each station is equipped with a set of motor running test equipment, and the motor running test equipment includes an equipment body, a running switch and a motor wiring terminal; and the equipment body is equipped with a timing device.

The end of the station frame away from the rack is the outlet end; the running switch of the motor running test equipment used includes a forward switch and a reverse switch; and the equipment body is provided with the timing device which is able to control the required time. The motor placing plates are fed from the inlet end of the rack, and the assembled motor is fixed on the motor placing plates. The detection workers pull the motor placing plates by hands to slide on the rack slide rail so as to conduct a displacement on the rack, then pull the motor placing plates to the station frame slide rail by hands so as to move the motor placing plates to a station, and connect the motor to a wiring terminal of the motor running equipment. A motor running test is performed by turning on the forward switch or the reverse switch. The motor running tests for a variety of durations are realized by a timer arranged on the equipment body. The motor placing plates are moved out from the outlet end of the station and sorted at the end of the test.

Preferably, the station frame is of a dual-layer arrangement, and the station frame includes an upper station frame in an upper layer and a lower station frame in a lower layer; a lifting frame is provided between the station frame and the rack, and the lifting frame is provided with a lifting cylinder and a lifting platform; the upper station frame and the lower station frame are provided with a station frame slide rail, respectively; the station frame slide rail of the upper station frame is communicated to the rack slide rail, and the station frame slide rail of the lower station frame is not communicated to the rack slide rail; and the lifting cylinder can control the rise and fall of the lifting platform so that the motor placing plates move to the upper station frame or the lower station frame.

When performing detection on a motor on a station, the motor placing plates can be placed on the rack to fix the motor for the next detection of the motor, in order to shorten the time required for the detection. The motor placing plates can be moved successively at high speed by means of sliding delivery. The coordination of the lifting cylinder and the lifting platform can realize the transition between many running tests.

Preferably, the rack slide rail and the station frame slide rail are provided with pulleys by which the motor placing plates slide. Fixing the pulleys on the rack slide rail and the station frame slide rail instead of the motor placing plates makes it convenient to move and arrange the motor placing plates; and the coordination of the slide rails and the pulleys, without using a conveyer belt, can save power consumption. The line of the present invention can be placed in a relatively small room to perform running tests on motors, and due to the relatively small room area, the operating region to be responded by detection workers is relatively small, so that the detection workers can completely pull the motor placing plates to slide so as to realize the running of motors on the motor placing plates.

Preferably, on one side of the lifting platform away from the station frame, an elongated fixing device is provided; the fixing device includes a recess having a curved cross section, and the recess faces the station frame; and a bump structure which can be engaged with the recess is provided at one end of the motor placing plate. The lifting platform is provided with a fixing device which can prevent the motor placing plates from sliding into the station and solve the blocking of the switchover of delivery modes between station lines. The detection workers press the motor placing plates by hands, and exert a force on them in the direction of the station to disengage the bump structure from the recess and make the motor placing plates slide toward the direction of the station. The engagement of the recess and the bump structure enables the fixation of the motor toward the direction of the station frame, and because the recess is elongated and has a same cross section, it is convenient for the motor plating plates to slide out toward the direction of the rack so as to move.

Preferably, the lifting platform is provided with a plurality of elastic devices on which the motor placing plates can slide; and the elastic device includes a hollow limiting post, a round ball is provided on an inner side of an upper end of the limiting post, one end of the round ball is projected from the limiting post, and a spring is provided on a lower side of the round ball and two ends of the spring are resisted against the bottom of the round ball and the bottom of the limiting post, respectively.

The arrangement of the elastic device can make it convenient for the bump structure of the motor placing plates to separate from the recess on the lifting platform. The elastic device is provided with a round ball by which the friction, produced when the detection workers pull the motor placing plates by hands to move the motor placing plates from the lifting platform, can be reduced.

Preferably, the lifting cylinder of the lifting frame is lifted up to an upper limit position, the lifting platform can be brought into connection with the rack and the upper station frame; and when the lifting cylinder of the lifting frame is lifted down to a lower limit position, the lifting platform can be brought into connection with the lower station frame. Since it is unnecessary to control the lifting height of the cylinder, the time required for moving the motor placing plates before the detection can be shortened.

Preferably, a cylinder fixing plate is provided at an upper end of the lifting cylinder and a lifting shaft of the lifting cylinder passes through the cylinder fixing plate; the cylinder fixing plate is fixed to the lifting frame; the lifting platform is fixed above the lifting shaft; a guide rode, which is vertically downward and arranged on two opposite sides of the lifting shaft, is provided on a lower end surface of the lifting platform; and a guide slot through which the guide rod can pass is formed on the cylinder fixing plate. The arrangement of the guide rod enables the lifting platform to be fixed axially.

Preferably, the station frames are spaced apart in many groups, and each group of station frames includes two station frames which are arranged in reverse front and rear orientations. This arrangement enables to perform the running test on more motors in a relatively small space. To improve the running efficiency of the motor placing plates, the station frames can be designed as linear frames, and a plurality of station frames can be vertically arranged on a side surface of the rack; to make it convenient for one detection worker to work, the number of stations on each row of station frames can be controlled as 4 to 6; and to make an easy access for the detection worker, there is a space left on the side surface of many groups of station frames which are arranged perpendicularly to the rack, and every detection worker takes charge of stations on the upper station frame and on the lower station frame of adjacent station frames in two groups.

Preferably, both two ends of the rack are inlet ends, and one end of the station frame away from the rack is an outlet end. If the rack is relatively long and there are many station frames connected to the rack, it is desired to arrange a plurality of inlet ends on the rack to deliver the motor placing plates and motors to be detected.

Preferably, a motor test equipment case that is arranged in parallel to the station frame is placed on the station frame; the equipment body of the motor running test equipment equipped for the station is located inside the motor test equipment case; and the running switches of the motor running test equipment and the motor wiring terminal are fixed to the outside of the motor test equipment case, respectively. The arrangement of the motor test equipment case can make the appearance of the present invention more beautiful, and can hide electric wires like wiring rows, which prevents the wires from being wrongly connected.

With the motor running test line of the present invention, line-type detection can be realized and running testing detection of more motors will be conducted in a relatively small space, so that the utilization of the motor running test equipment can be improved, the time required by the motor detection can be shortened and the production efficiency of motors can be improved.

DETAILED DESCRIPTION OF THE INVENTION

Figure 1:
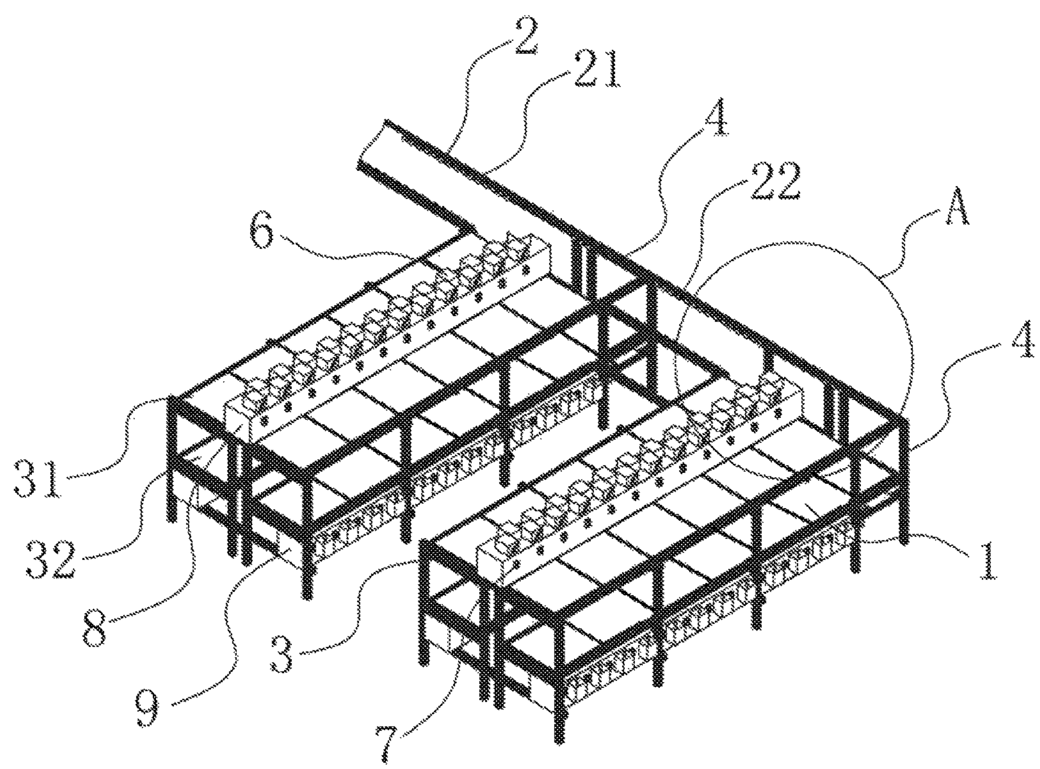
FIG. 1 is a schematic structure diagram of the present invention.

As shown in FIG. 1, an motor running test line of the present invention includes a plurality of motor placing plates 1, a rack 2 and a plurality of station frames 3. The station frames 3, which are spaced apart in many groups, are provided on the same side of the rack 3, and each group has two station frames 3 which are arranged in reverse front and rear orientations.

The rack 2 is provided with a rack slide rail which makes it possible for motor placing plates to slide thereon; the station frame 3 is provided with a rack slide rail 21 which makes it possible for motor placing plates to slide thereon; and one end of the station frame 3 is communicated to the rack slide rail 21.

Each of the station frames 3 is of a dual-layer arrangement; a lifting frame 4 is provided between the rack 2 and the station frame 3; the station frame 3 includes an upper station frame 31 in an upper layer and a lower station frame 32 in a lower layer; and the rack 2 is on the same height as the upper station frame 31. A protection pad is provided on the bottom of the rack 2, the station frame 3, and the lifting frame 4, respectively, in order to avoid damage to the terrace in the workshop.

Figure 3:
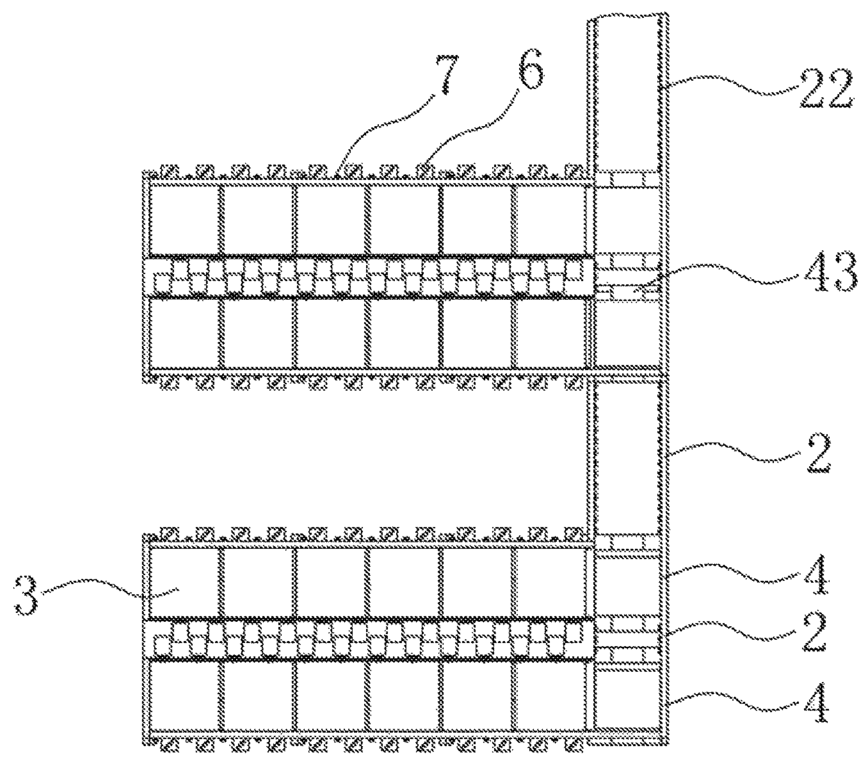
FIG. 3 is a top view of FIG. 1.
Figure 5:
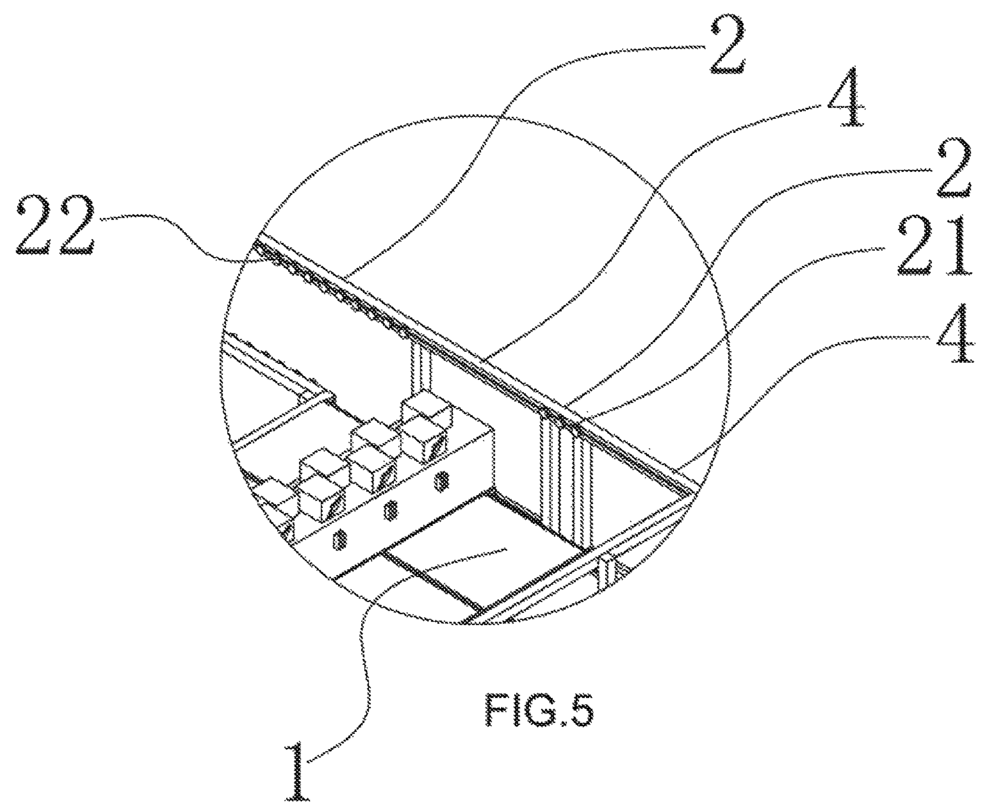
FIG. 5 is an enlarged view of part A of FIG. 1.

As shown in FIG. 1, FIG. 3, and FIG. 5, a station frame slide rail is provided on both sides of the upper station frame 31 and on both sides of the lower station frame 32, respectively; a pulley 22 is provided on the rack slide rail 21 and the station frame slide rail so as to enable the motor placing plates 1 to slide on the slide rail; and the motor placing plates 1 are square plates, and the width of the rack slide rail 21 and the width of the station frame slide rail are the same. Two ends of the rack 2 are inlet ends; ends of the upper station frame 31 and the lower station frame 32 of the station frame 3 away from the rack 2 are outlet ends; and the upper station frame 31 and the lower station frame 32 in each row of station frames have six stations, and each station is provided with a set of motor running test equipment.

As shown in FIG. 1, FIG. 2, FIG. 3, and FIG. 4, the motor running test equipment includes the equipment body, a running switch 6 and a motor wiring terminal 7. A timer which is able to control the required time is provided on the equipment body, and there are two running switches in each set of motor running test equipment. The running switch in front of each station includes a forward switch on the left and a reverse switch on the right.

Figure 4:
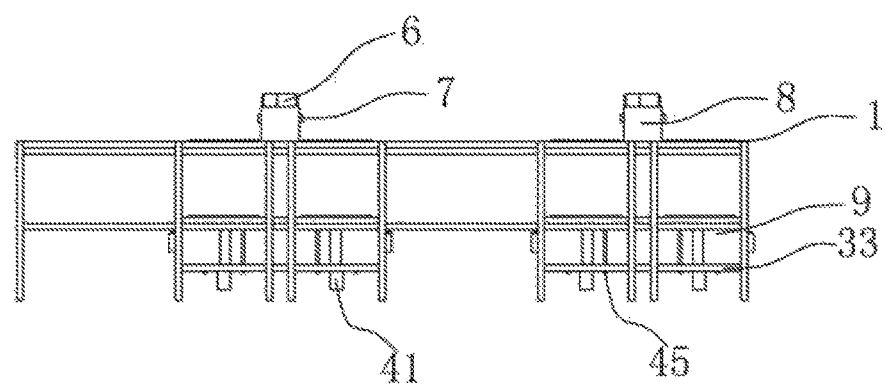
FIG. 4 is a left view of FIG. 1.

As shown in FIG. 1, FIG. 3, and FIG. 4, a motor test equipment case that is arranged in parallel to the station frame is placed on the station frame; the motor test equipment case includes an upper motor test equipment case 8 located on the upper station frame and a lower motor test equipment case 9 located on the lower station frame.

The upper motor test equipment case 8 is arranged in the upper part between each group of station frames 3; the equipment bodies of the motor running test equipment, which are provided for stations on the upper station frame 31 in each group of station frames 31, are arranged inside the upper motor running test equipment case 8; the running switches 6, which are provided for stations on the upper station frame 31 in each group of station frames 31, are alternately arranged front to back on the upper side of the upper motor test equipment case 8; and the motor wiring terminals 7, which are provided for stations on the upper station frame 31 in each group of station frames 31, are arranged on the front and back sides of the upper motor test equipment case 8.

As shown in FIG. 1, FIG. 2, FIG. 3, and FIG. 4, a cross beam 33 is provided below the lower station frame 32, and the lower motor test equipment case 9 is arranged on the cross beam 33; the equipment bodies of the motor running test equipment for the lower station frame 32 are arranged inside the lower motor test equipment case 9; and the running switch 6 and the motor wring terminal 7 are provided on the outside of the lower motor test equipment case, and the running switch 6 is arranged upward.

Figure 2:
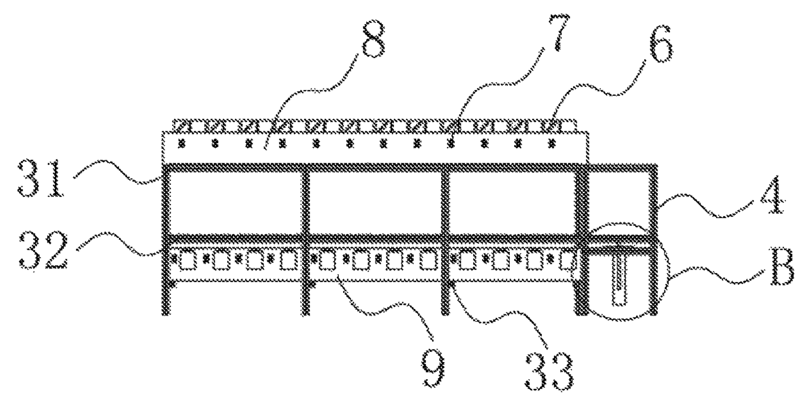
FIG. 2 is a front view of FIG. 1.
Figure 7:
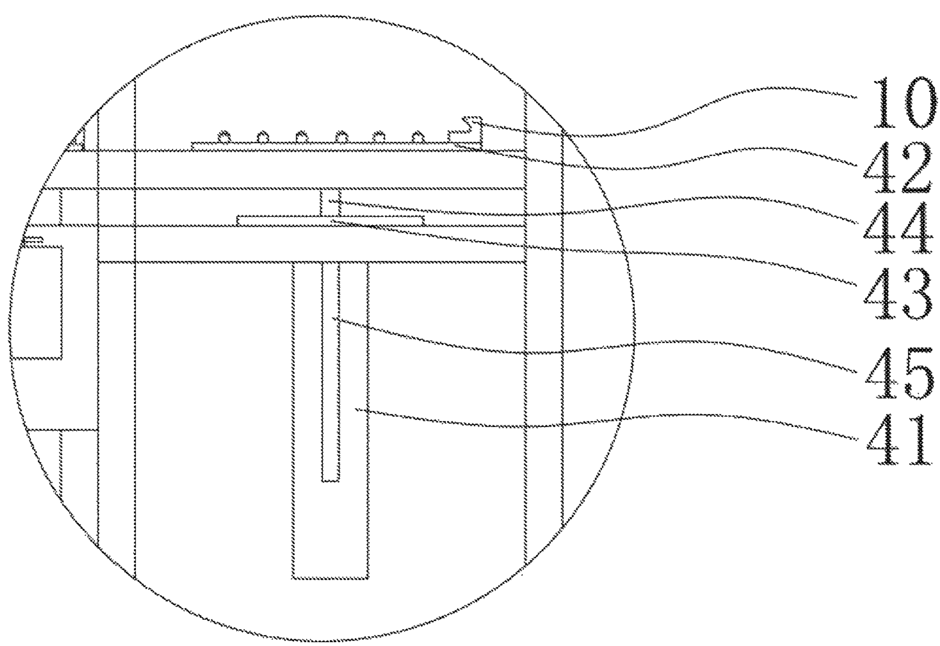
FIG. 7 is an enlarged view of part B of FIG. 2.

As shown in FIG. 2, FIG. 4, and FIG. 7, the lifting frame 4 includes a lifting cylinder 41 and a lifting platform 42, the lifting cylinder 41 is able to control the lifting platform 42 to rise and fall so that the motor placing places 1 can move to the upper station frame 31 or to the lower station frame 32, and a fixing device which can fix the motor placing plates 1 is provided on the lifting platform 42.

A cylinder fixing plate 43 is provided at the upper end of the lifting cylinder 41 and a lifting shaft 44 of the lifting cylinder 41 passes through the cylinder fixing plate 43; the cylinder fixing plate 43 is fixed to the framework of the lifting frame 4; the lifting platform 42 is fixed above the lifting shaft 44; a guide rode 45, which is vertically downward and arranged on two opposite sides of the lifting shaft 44, is provided on a lower end surface of the lifting platform 42; and a guide slot through which a guide rod 45 can pass is formed on the cylinder fixing plate 43.

When the lifting cylinder 41 of the lifting frame 4 is lifted up to an upper limit position, the lifting platform 42 can be brought into connection with the rack 2 and the upper station frame 31; and when the lifting cylinder 41 of the lifting frame 4 is lifted down to a lower limit position, the lifting platform 42 can be brought into connection with the lower station frame 32.

Figure 6:
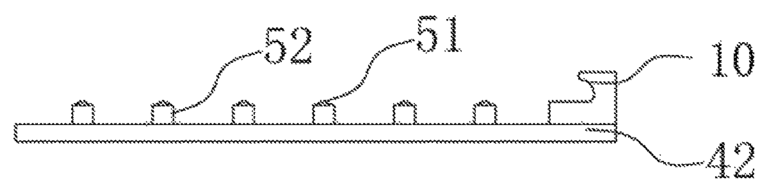
FIG. 6 is a side view of a lifting platform of the present invention.

As shown in FIG. 2, FIG. 6, and FIG. 7, on one side of the lifting platform 42 away from the station frame 3, a fixing device is provided; on the fixing device, a recess 10 having a curved cross section is provided, and the recess 10 faces the station frame 3; and a bump structure which can be engaged with the recess 10 is provided at one end of the motor placing plate 1.

As shown in FIG. 6, thirty-six elastic devices 5 are provided on the lifting platform; the elastic devices which are spaced apart evenly in six rows and six columns are arranged on the lifting platform; and the fixing device is arranged on the right side of the elastic devices. An elastic device 5 includes a hollow limiting post 52, a steel ball 51 is provided on an inner side of an upper end of the limiting post, and one end of the steel ball 51 is projected from the limiting post 52; and a spring is provided on a lower side of the steel ball 51 and two ends of the spring are resisted against the bottom of the steel ball 51 and the bottom of the limiting post 52, respectively.

When the bump structure of the motor placing plates 1 is engaged with the recess 10 of the fixing device, the bottom of the motor placing plates 1 is resisted against the top of the steel ball of the elastic device 5.

There is a detection region between each group of station frames. Every detection worker takes charge of stations on the upper station frame and on the lower station frame of two adjacent station frames in two groups. The detection worker transfers a motor to a station on the upper station frame and to a station on the lower station frame by pulling the motor placing plates by hands, in coordination with the rise and fall of the lifting platform of the lifting frame, then connects the motor to the motor wiring terminal of the motor running test equipment, and finally turns on the running switch to perform a running test on motors.

What is claimed is:

1. A flowline production equipment for motor running test, comprising:

a plurality of motor placing plates;

a rack provided with an inlet end and a rack slide rail which makes it possible for motor placing plates to slide thereon; and a plurality of station frames each provided with an outlet end and a station frame slide rail which makes it possible for motor placing plates to slide thereon;

wherein one end of each station frame is communicated to the rack slide rail, wherein each station frame is provided with a plurality of stations, wherein each station is equipped with a set of motor running test equipment comprising an equipment body equipped with a timing device, a running switch and a motor wiring terminal.

2. The flowline production equipment for motor running testing according to claim 1, wherein the rack slide rail and the station frame slide rail are provided with pulleys, by which the motor placing plates slide.

3. The flowline production equipment for motor running test according to claim 1, wherein the station frames comprise a plurality of groups, and each group of station frames comprises two station frames which are arranged in reverse front and rear orientations.

4. The flowline production equipment for motor running test according to claim 1, wherein ends of the rack are inlet ends, and ends of the station frame away from the rack are outlet ends.

5. The flowline production equipment for motor running test according to claim 1, wherein a motor test equipment is arranged in parallel to and on the station frame, running switches and motor wiring terminals are fixed to outside of a case of the motor test equipment.

6. The flowline production equipment for motor running test according to claim 1, wherein the station frame is of a dual-layer arrangement and comprises an upper station frame in an upper layer and a lower station frame in a lower layer, a lifting frame provided between the station frame and the rack has a lifting cylinder and a lifting platform, the upper station frame and the lower station frame are provided with a station frame slide rail respectively, the station frame slide rail of the upper station frame is communicated to the rack slide rail, the lifting cylinder controls the rise and fall of the lifting platform, for moving the motor placing plates to the upper station frame or the lower station frame.

7. The flowline production equipment for motor running testing according to claim 6, wherein the rack slide rail and the station frame slide rail are provided with pulleys by which the motor placing plates slide.

8. The flowline production equipment for motor running test according to claim 6, wherein the lifting platform is provided with a plurality of elastic devices on which the motor placing plate can slide, the elastic device comprises a hollow limiting post, a round ball is provided on an inner side of an upper end of the limiting post, one end of the round ball is projected from the limiting post, and a spring is provided on a lower side of the round ball and two ends of the spring are resisted against the bottom of the round ball and the bottom of the limiting post respectively.

9. The flowline production equipment for motor running test according to claim 6, wherein when the lifting cylinder of the lifting frame moves up to an upper limit position, the lifting platform makes a connection with the rack and the upper station frame, and when the lifting cylinder of the lifting frame moves down to a lower limit position, the lifting platform makes a connection with the lower station frame.

10. The flowline production equipment for motor running test according to claim 6, wherein a cylinder fixing plate is provided at an outlet end of the lifting cylinder and a lifting shaft of the lifting cylinder passes through the cylinder fixing plate, the cylinder fixing plate is fixed to the lifting frame, the lifting platform is fixed above the lifting shaft, a guide rod, which is vertically downward and arranged on two opposite sides of the lifting shaft, is provided on a lower end surface of the lifting platform, and a guide slot for passing the guide rod is formed on the cylinder fixing plate.

11. The flowline production equipment for motor running test according to claim 6, wherein ends of the rack are inlet ends, and ends of the station frame away from the rack are outlet ends.

12. The flowline production equipment for motor running test according to claim 6, wherein on one side of the lifting platform away from the station frame, an elongated fixing device is provided; the fixing device comprises a recess having a curved cross section, and the recess faces the station frame; and a bump structure which can be engaged with the recess is provided at one end of the motor placing plate.

13. The flowline production equipment for motor running test according to claim 12, wherein the lifting platform is provided with a plurality of elastic devices on which the motor placing plate can slide, the elastic device comprises a hollow limiting post, a round ball is provided on an inner side of an upper end of the limiting post, one end of the round ball is projected from the limiting post, and a spring is provided on a lower side of the round ball and two ends of the spring are resisted against the bottom of the round ball and the bottom of the limiting post respectively.

* * * * *